June 17, 1941.   W. A. RIDDELL   2,246,006

SHUTTER TRIGGER LOCK

Filed Oct. 5, 1939

WILLIAM A. RIDDELL
*INVENTOR*

BY
*ATTORNEYS*

Patented June 17, 1941

2,246,006

UNITED STATES PATENT OFFICE 2,246,006

SHUTTER TRIGGER LOCK

William A. Riddell, Rochester, N. Y., assignor to Eastman Kodak Company, Rochester, N. Y., a corporation of New Jersey Application October 5, 1939, Serial No. 298,091

9 Claims. (Cl. 95—63)

This invention relates to photography and more particularly to photographic shutters.

One object of my invention is to provide a photographic shutter of the type having a setting lever for placing the master member under tension with a latch for holding the trigger in a depressed position, except at such times as when the shutter is set. Another object of my invention is to provide a shutter trigger which may move towards its operative position only when the shutter setting member is moved to tension the master member. Still another object of my invention is to provide a setting lever for shutters which directly engages and latches a portion of the shutter trigger when in an inoperative position so that movement of the trigger in both directions is definitely prevented, and other objects will appear from the following specification, the novel features being particularly pointed out in the claims at the end thereof.

I am aware that shutters have been proposed in which the shutter trigger is latched in a raised position or in an inoperative position and is then released by setting the shutter, but this type of shutter has certain disadvantages for use with double exposure prevention cameras because it is desirable to definitely hold the trigger in its inoperative position rather than its operative position. I am also aware that setting shutters have been proposed in which the shutter trigger is normally held in an inoperative position from which it is moved by the setting lever, but this type of shutter also has certain disadvantages because the shutter trigger is not latched at all but merely spring-held in an inoperative position from which it may be manually moved. In the preferred form of my present invention the shutter trigger is normally raised by a spring into an operative position, but when it is depressed, it is definitely retained in its depressed position and cannot be manually moved in either direction unless the shutter is first set. In another form of my invention the trigger may be manually moved, but if this is done, the setting lever will also be moved in a direction to set the shutter. This type of shutter trigger lock has many advantages when applied to double exposure prevention cameras because it permits the use of either a flexible or a non-flexible connecting member between the shutter and the camera body.

Coming now to the drawing wherein like reference characters denote like parts throughout:

Figure 1:
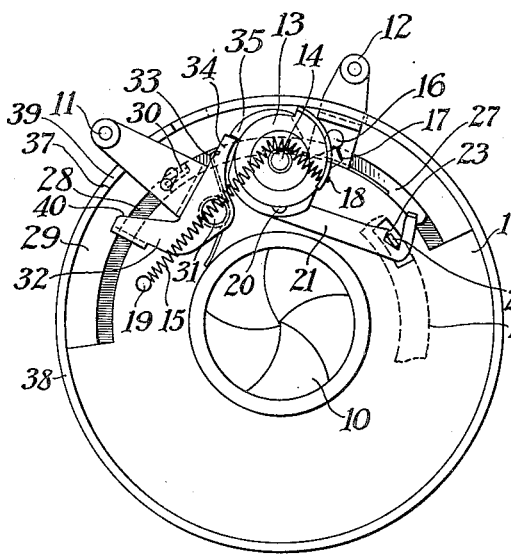
Fig. 1 is a plan view of a shutter equipped with and embodying a preferred form of my shutter trigger lock construction, the trigger being in an operative position.

The shutter shown in the drawing, which is a preferred embodiment of my invention, is of a well known type and the drawing has omitted, for the sake of clearness, a gear retard and a time and bulb mechanism which forms no part of the present invention.

Figure 3:
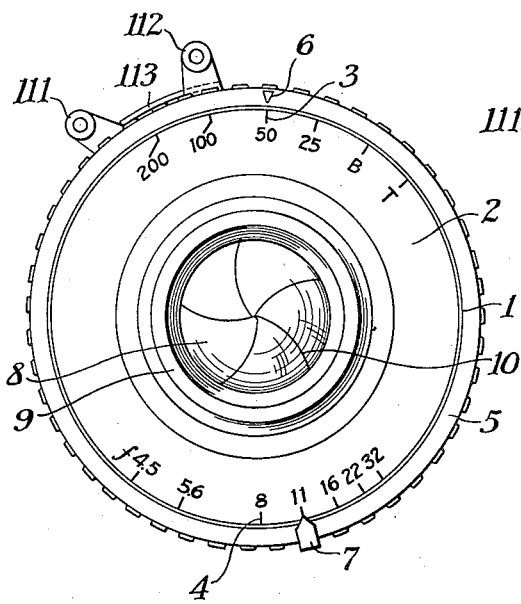
Fig. 3 is a plan view of the shutter showing the shutter cover and the exterior parts of the shutter casing and illustrating a second embodiment of my invention.

Referring to Fig. 3, the shutter may consist of a shutter casing 1, having a front plate 2 bearing the usual speed scale 3, and a diaphragm scale 4. There may be a setting ring 5, which is preferably knurled and which preferably extends around the periphery of the shutter, this ring bearing a pointer 6. A second pointer 7 may be used to adjust the diaphragm scale. An objective, having a front lens element 8 mounted in the cell 9, is carried by the front of the shutter and the shutter leaves 10 lie behind the front lens element. The shutter is provided with a trigger 11, and a setting lever 12 is employed which is moved from the position shown in Fig. 3 to the position shown in Fig. 1 to place the shutter in condition for exposure.

Figure 2:
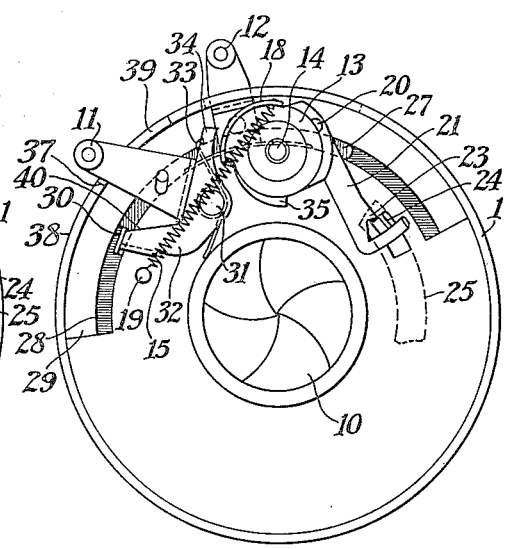
Fig. 2 is a view similar to Fig. 1, but with the shutter trigger in its latched position.

The shutter casing 1 carries a master member 13, which is pivoted upon a stud 14 and which may be turned in a clockwise direction with reference to Fig. 2 to tension the spring 15 by means of the setting lever 12, which includes a pin 16 adapted to bear against and move the lug 17 on the master member 13. The spring 15 is anchored to a flange 18 on the master member at one end, and to a stud 19 on the shutter casing and is preferably arranged so that movement of the master member will raise a portion of the spring around the upstanding stud 14.

The master member carries a pivot 20, to which a latch member 21 is attached, the latch member including a hook 23, adapted to engage an upstanding lug 24 on the blade ring 25, which is pivotally attached to the blades 10 to oscillate the blade ring to make an exposure in the usual manner when the latch member is rocked from the position shown in Fig. 1 to the position shown in Fig. 2.

Upon setting the shutter, the hook 23 slides past the lug 24, and consequently, the shutter blades are not opened and closed. As thus far described, the construction is all well known.

Figure 5:
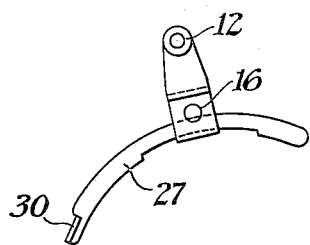
Fig. 5 is a plan view of the shutter setting lever removed from the camera casing and used in the embodiments of my invention shown in Figs. 1 and 2.

Referring to Fig. 5, the setting lever 12, which carries the setting pin 16, has an arcuate shoe 27, which is adapted to slide in a slideway in the form of a groove 28 in the camera shutter plate 29. This slideway can be conveniently made concentric with the axis of the objective, and on the end of one of the arms formed by the arcuate shoe 27, there is an upstanding lug 30. This lug travels through the groove 28 when the setting lever is moved, and, as indicated in Fig. 3, when the trigger 11 has been depressed, turning it about its pivot 31 until the arm 32 lies in the position shown in this figure, the lug 30, through movement of the master member setting lever 12, will slide directly behind the end of the arm, thus preventing the trigger from returning to its initial position under the influence of its spring 33.

In other words, when the shutter trigger has been moved to the position shown in Fig. 2, the latch element 34 becomes disengaged from the cooperating latch element 35 on the master member 13 and the master member, under the influence of its spring 15, swings quickly in a counter-clockwise direction, opening and closing the shutter blades. This movement causes the handle 12 to also move so that the lug 30 is quickly moved into the position shown in Fig. 2 to retain the trigger in its depressed position.

It should be noticed that when the trigger has been moved in its inoperative position, it is definitely latched against upward movement by means of the lug 30, and against downward movement by means of the projection 37 on the edge of the upstanding flange 38 which forms the end of the slot 39, through which the shutter trigger may operate. Thus, any part of a double exposure prevention mechanism which is attached to the shutter trigger will be definitely held in its lowermost position. The mechanism may be released by turning a film winding key in the usual manner, but since the trigger is still latched down, it will be impossible to actuate the shutter, even though the film be wound, unless the shutter trigger lever 12 is first moved.

By moving the shutter setting lever 12 from the position shown in Fig. 2 to the position shown in Fig. 1, the action of the parts is as follows: As soon as the lever 12 is moved a short distance, the upstanding lug 30 will move out of the direct path of the trigger arm 32 until the cam edge 40 of the trigger rests against the lug. The trigger tends to turn to its operative position because of its spring 33. Consequently as the setting lever 12 is moved in a clockwise direction and as the cam surface 40 rides on the lug 30, the trigger will quickly swing to its latching position and reach this position before the master member 13 is turned a sufficient distance for the latch elements 34 and 35 to engage. Therefore, as soon as the lever 12 has been turned to its operative or set position, as shown in Fig. 1, the trigger will be in position to immediately latch the master member in its set position.

From this position, it is only necessary to depress the trigger 11 to make an exposure as indicated on the speed scale 3. The trigger is depressed and the lug 30 immediately slides into latching position by reason of the operation of the master member.

It will thus be seen that I have provided a shutter trigger latch which definitely holds the trigger in its inoperative position after an exposure has been made. When in such a position, pressure applied to the trigger in an attempt to move it downwardly or upwardly does not affect the trigger because it definitely cannot be moved.

However, as soon as the setting lever is moved, the trigger is quickly released and moves toward its normal position in advance of the movement of the master member so that when the master member reaches a position in which the spring 15 is fully tensioned, the latch 34 will be thrust into engagement with the latch 35 by means of the trigger spring 33.

Figure 4:
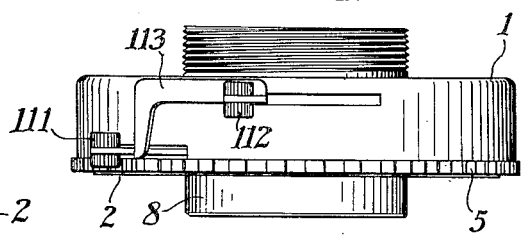
Fig. 4 is a top plan view of a shutter constructed in accordance with the form of my invention shown in Fig. 3, and as in Fig. 3 the shutter latching means is placed on the outside of the shutter casing.

Referring to Fig. 4, it will be noted that if desired, a shutter may be arranged with a trigger blocking member entirely on the outside of the shutter casing. Thus, it would be easily possible to equip shutters already on the market with my improved trigger latching mechanism, by the addition of a simple part 113 to the shutter setting lever 112, the size and shape of this part being such that when the shutter setting lever 112 is in its inoperative position of rest, the edge of member 113 will lie across the path of the trigger 111 and thus prevent the trigger from returning to its initial position. When, however, the setting member 112 is swung clockwise with respect to Fig. 4, it carries with it the blocking member 113 so that the trigger 111 is permitted to return to its operative position in time to engage the master member and latch it in a fully set position, as explained above in connection with the first embodiment of my invention.

When in this position, the trigger 111 may be depressed to make an exposure and as the exposure is made, the arm 113, carried by trigger 112, will quickly move down to a latching position to hold the trigger 111 against movement, except at such times as when the master member is tensioned.

I claim:

1. In a photographic shutter, the combination with a shutter casing, of an exposure aperture therein, shutter leaf means movably mounted and adapted to make an exposure by opening and closing said aperture, mechanism for moving said shutter leaf means, including a spring operated master member, a handle always movable with the master member for moving the master member to tension the spring setting the shutter for an exposure, a movable trigger for latching the master member in a set position and for releasing it to make an exposure as the spring tensioning runs down and a latch between the trigger and the setting handle operable only when the trigger is depressed and the master member runs down for locking the trigger in a position in which it cannot engage the master member.

2. A photographic shutter comprising a casing, a master member carried thereby, a spring adapted to drive the master member in one direction, a handle for tensioning the master member spring and movable with the master member in both directions, a movably mounted trigger for holding the master member in a tensioned position and for releasing the master member to make an exposure as the spring runs down, and an abutment carried by the handle for setting the master member and movable with said handle to block the movement of the trigger when said setting lever is moved with the master member to a run-down position after the trigger is moved to make an exposure.

3. A photographic shutter comprising a casing, a master member carried thereby, a spring adapted to drive the master member in one direction, a handle operably connected to the master member to move therewith for tensioning the master member spring, a movably mounted trigger adapted to move through a path for holding the master member in a tensioned position and for releasing the master member to make an exposure as the spring runs down, and an abutment carried by the handle for setting the master member and movable across the path of the trigger and adapted with said handle to block the movement of the trigger when said setting lever moves with the master member to a run down position after the trigger is moved to make an exposure, and a spring tending to turn the trigger into latching engagement with the master member and toward said abutment.

4. A photographic shutter comprising a casing, a master member carried thereby, a spring adapted to drive the master member in one direction, a handle operably connected to the master member for tensioning the master member spring, a movably mounted trigger adapted to move through a path for holding the master member in a tensioned position and for releasing the master member to make an exposure as the spring runs down, and an abutment carried by the handle for setting the master member and movable across the path of the trigger and adapted with said handle to block the movement of the trigger when said setting lever moves with the master member after the trigger is moved to make an exposure as the spring runs down and when the trigger has been moved to a releasing position, a cam surface on the trigger for engaging said abutment and permitting movement of the trigger toward latching position as said handle is moved to set the shutter, the shape of the cam being such that the abutment leaves the cam before the master member is fully set.

5. In a photographic shutter for cameras, a casing, a master member movably mounted therein, a spring tending to move the master member in one direction to actuate shutter mechanism to make an exposure as the spring runs down, a trigger for holding the master member in a set position, a mount on which the trigger may move through a fixed path, a setting lever including a handle adapted to move through a fixed path with the master member for tensioning the master member spring, said trigger being adapted to engage and hold the master member in a set position, and an abutment carried by the setting lever adapted to cross the path of the trigger and prevent movement thereof when said trigger has been depressed to make an exposure and the spring driven master member has run down.

6. In a photographic shutter, the combination with a shutter casing, of an exposure aperture therein, a shutter leaf means movably mounted and adapted to make an exposure by opening and closing said aperture, mechanism for moving said shutter leaf means including a spring-operated master member, a handle for moving the master member to tension the spring setting the shutter for an exposure and movable with the master member in setting and releasing directions, a movable trigger mounted to move through a path between a master member latching and a releasing position for latching the master member in a set position and for releasing it to make an exposure, and means operable by the setting handle and movable through a path intercepting the path of the trigger and adapted to engage and hold the trigger against movement when both the trigger and the setting handle have been moved to their shutter releasing positions.

7. In a photographic shutter, the combination with a shutter casing, of an exposure aperture therein, shutter leaf means movably mounted and adapted to make an exposure by opening and closing said aperture, mechanism for moving said shutter leaf means including a spring-operated master member, a handle mounted to move with the master member in setting and releasing directions for moving the master member to tension its spring for setting the shutter for an exposure, a movable trigger adapted to move through a path for latching the master member in a set position and for releasing it to make an exposure as the spring moves the master member, an extension carried by said handle and movable to a position in the path of the trigger for latching the trigger when the trigger is moved and retained in releasing position until said spring-driven master member moves with the shutter mechanism in making an exposure.

8. In a photographic shutter, the combination with a shutter casing, of an exposure aperture therein, shutter leaf means movably mounted and adapted to make an exposure by opening and closing said aperture, mechanism for moving said shutter leaf means including a spring-operated master member, a handle for moving the master member to tension the spring setting the shutter for an exposure and movable with the master member in both setting and releasing directions, a movable trigger for latching the master member in a set position and for moving to an inoperative position releasing it to make an exposure, a spring tending to turn the trigger toward an operative position in which the shutter may be set, and means operable by the shutter setting handle moving in a releasing direction for holding the trigger against the pressure of its spring except when the handle is moved towards its master member spring tensioning position.

9. In a photographic shutter, the combination with a shutter casing, of an exposure aperture therein, a shutter leaf means movably mounted and adapted to make an exposure by opening and closing said aperture, mechanism for moving said shutter leaf means including a spring-operated master member, a handle always movable with the master member for moving the master member to tension the spring setting the shutter for an exposure, a movable trigger for latching the master member in a set position and for releasing it to make an exposure as the spring-operated master member runs down, and a latch between the trigger and the setting handle for locking the trigger in a releasing position in which it cannot engage the master member, said locking occurring only when the master member has run down, the latch being automatically releasable by movement of the setting handle before the master member is moved to its set position.

WILLIAM A. RIDDELL.